US009361458B1

(12) United States Patent
Feng et al.

(10) Patent No.: US 9,361,458 B1
(45) Date of Patent: Jun. 7, 2016

(54) LOCALITY-SENSITIVE HASH-BASED DETECTION OF MALICIOUS CODES

(71) Applicant: Trend Micro Incorporated, Tokyo (JP)

(72) Inventors: Hsiang-An Feng, Taipei (TW); Po-I Wang, Taipei (TW); Ming-Chin Zhuang, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 14/509,277

(22) Filed: Oct. 8, 2014

(51) Int. Cl.
*H04L 29/06* (2006.01)
*G06F 21/56* (2013.01)

(52) U.S. Cl.
CPC ........ *G06F 21/563* (2013.01); *G06F 2221/034* (2013.01)

(58) Field of Classification Search
CPC .................................................... G06F 21/563
USPC ............................................................ 726/23
See application file for complete search history.

(56) References Cited

U.S. PATENT DOCUMENTS

| 8,151,355 | B2 | 4/2012 | Fossen et al. |
| 8,230,510 | B1 | 7/2012 | Yang et al. |
| 8,272,058 | B2 | 9/2012 | Brennan |
| 8,370,594 | B2 | 2/2013 | Niles et al. |
| 8,375,451 | B1 | 2/2013 | Andruss et al. |
| 8,650,638 | B2 | 2/2014 | Ma et al. |
| 8,683,216 | B2 | 3/2014 | Harmonen |
| 8,812,854 | B2 | 8/2014 | Shah et al. |
| 2005/0283838 | A1* | 12/2005 | Saito ................... G06F 21/563 726/24 |
| 2013/0111591 | A1* | 5/2013 | Topan .................. G06F 21/563 726/24 |

* cited by examiner

*Primary Examiner* — Michael S McNally
(74) *Attorney, Agent, or Firm* — Okamoto & Benedicto LLP

(57) ABSTRACT

Malicious code is detected in binary data by disassembling machine language instructions of the binary data into assembly language instructions. Opcodes of the assembly language instructions are normalized and formed into groups, with each group being a subsequence of a sequence of machine language instructions of the binary data. The subsequence is delimited by a predetermined machine language instruction. Locality-sensitive hashes are calculated for each group and compared to locality-sensitive hashes of known malicious machine language instructions to detect malicious code in the binary data.

13 Claims, 8 Drawing Sheets

```
004010AC  . B8 FD000000      MOV EAX,0FD
004010B1  . E8 B6FFFFFF      CALL [old]OLL.0040106C
004010B6  > 50               PUSH EAX
004010B7  . 50               PUSH EAX
004010B8  . FF35 1B014B00    PUSH DWORD PTR DS:[4B011B]
004010BE  . E8 11C30A00      CALL [old]OLL.004AD3D4
004010C3  . FF35 1B014B00    PUSH DWORD PTR DS:[4B011B]
004010C9  . E8 1AC30A00      CALL [old]OLL.004AD3E8
004010CE  . 5F               POP EDI
004010CF  .>C3               RETN
004010D0  r. B9 9C000000     MOV ECX,9C
004010D5  . 0BC9             OR ECX,ECX
004010D7  .v 74 19           JE SHORT [old]OLL.004010F2
004010D9  . E8 CEC20A00      CALL [old]OLL.004AD3AC
004010DE  . A3 1B014B00      MOV DWORD PTR DS:[4B011B],EAX
004010E3  . 83F8 00          CMP EAX,0
004010E6  .^ 73 91           JNB SHORT [old]OLL.00401079
004010E8  . B8 FC000000      MOV EAX,0FC
004010ED  . E8 7AFFFFFF      CALL [old]OLL.0040106C
004010F2  L>C3               RETN
004010F3  r$ 833D 1B014B00   CMP DWORD PTR DS:[4B011B],0
004010FA  .v 72 28           JB SHORT [old]OLL.00401124
004010FC  . FF35 1B014B00    PUSH DWORD PTR DS:[4B011B]
00401102  . E8 BDC20A00      CALL [old]OLL.004AD3C4
00401107  . 0BC0             OR EAX,EAX
00401109  .v 74 19           JE SHORT [old]OLL.00401124
0040110B  . 50               PUSH EAX
0040110C  . 6A 08            PUSH 8
0040110E  . E8 83DF0A00      CALL <JMP.&KERNEL32.GetProcessHeap>
00401113  . 50               PUSH EAX
00401114  . E8 07E00A00      CALL <JMP.&KERNEL32.HeapFree>
00401119  . FF35 1B014B00    PUSH DWORD PTR DS:[4B011B]
0040111F  . E8 CCC20A00      CALL [old]OLL.004AD3F0
00401124  L>C3               RETN
```

FIG. 5

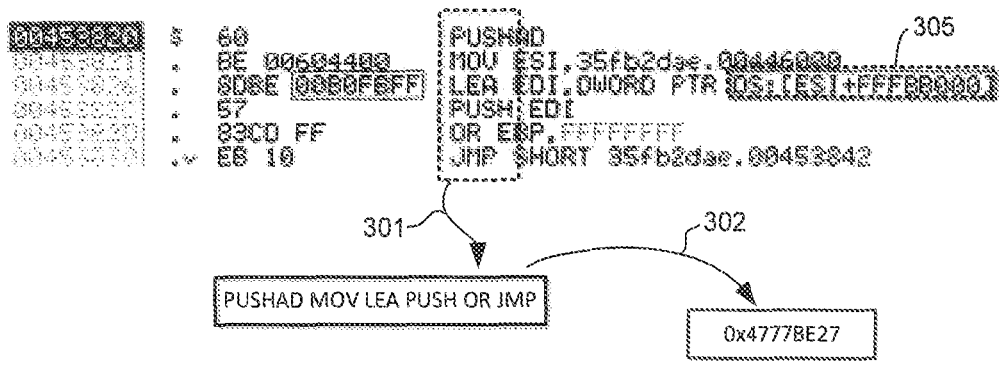
FIG. 6
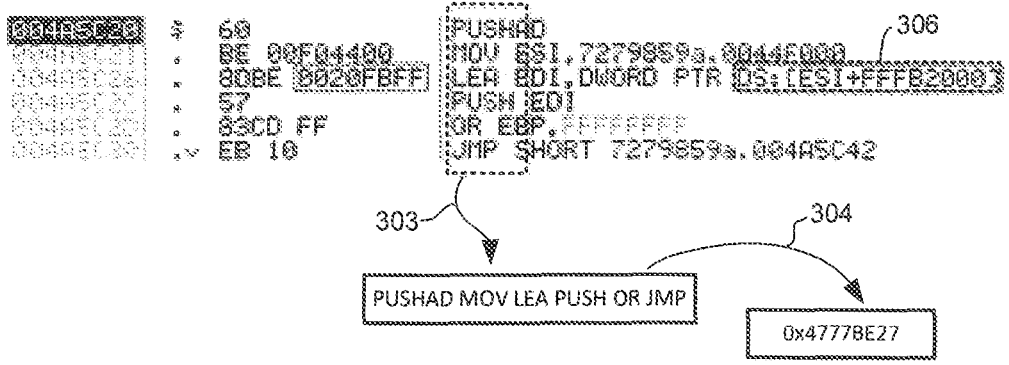
FIG. 7
FIG. 8

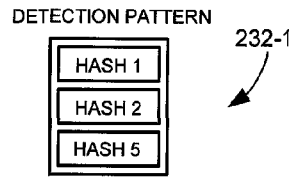
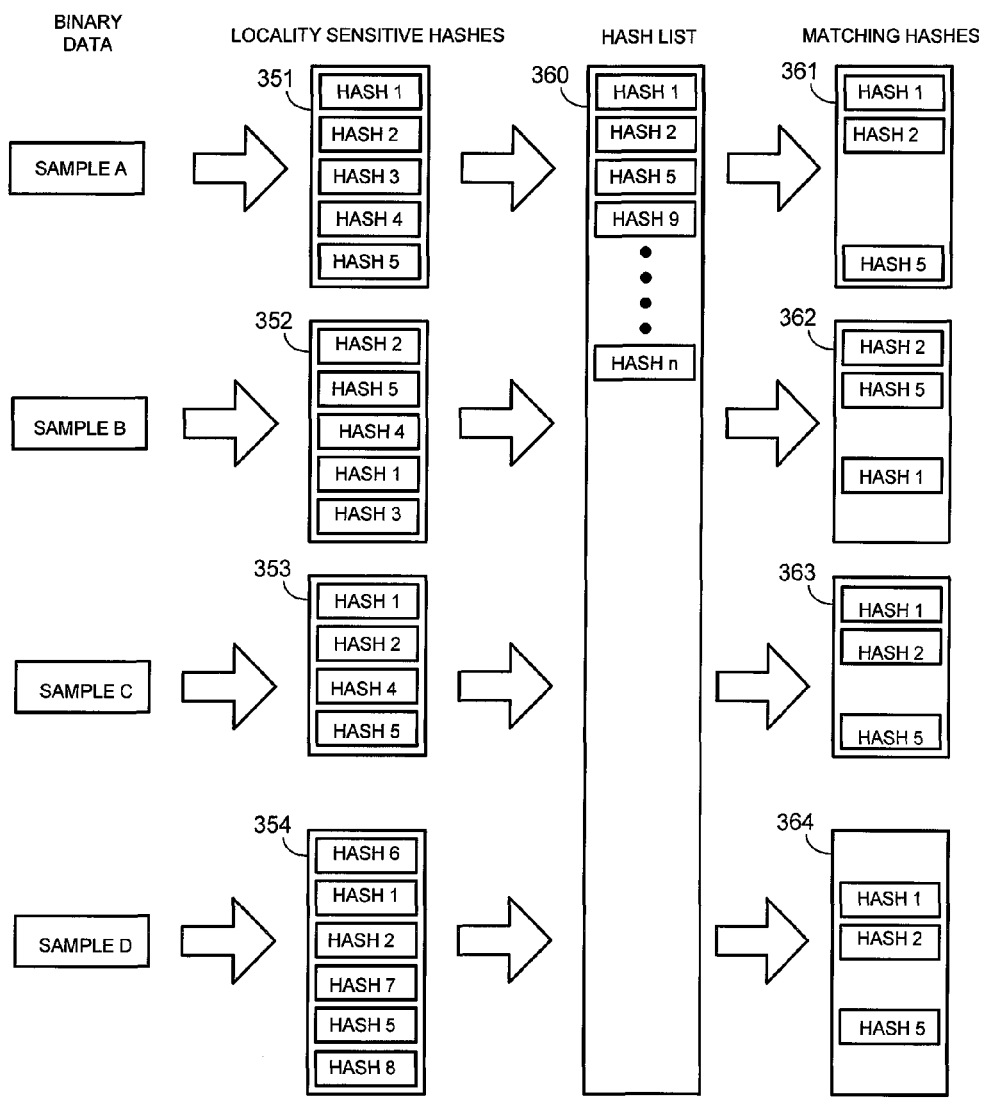
FIG. 9
FIG. 10

LOCALITY-SENSITIVE HASH-BASED DETECTION OF MALICIOUS CODES

BACKGROUND OF THE INVENTION

1. Field of the Invention

The present invention relates generally to computer security, and more particularly but not exclusively to methods and systems for detecting malicious codes.

2. Description of the Background Art

Computer viruses, worms, Trojans, rootkits, and spyware are examples of malicious codes that have plagued computer systems throughout the world. Various antivirus software have been developed to combat malicious codes. A typical antivirus software includes patterns of known malicious codes; the antivirus software looks for these patterns in data being evaluated. One problem with this approach is that a pattern for detecting a particular malicious code may be ineffective in detecting variants or slightly changed version of the malicious code. Although separate patterns may be created for the malicious code and its variants, this increases the storage and processing requirements of the antivirus software. Furthermore, there may be a delay between detecting a variant of malicious code and creating a pattern for the variant.

SUMMARY

In one embodiment, malicious code is detected in binary data by disassembling machine language instructions of the binary data into assembly language instructions. Opcodes of the assembly language instructions are normalized and formed into groups, with each group being a subsequence of a sequence of machine language instructions of the binary data. The subsequence is delimited by a predetermined machine language instruction. Locality-sensitive hashes are calculated for each group and compared to locality-sensitive hashes of known malicious machine language instructions to detect malicious code in the binary data.

These and other features of the present invention will be readily apparent to persons of ordinary skill in the art upon reading the entirety of this disclosure, which includes the accompanying drawings and claims.

DESCRIPTION OF THE DRAWINGS

FIG. 5 shows an example sequence of machine language instructions stored in an input buffer in accordance with an embodiment of the present invention.

FIG. 6 shows a subsequence of the machine language instructions shown in FIG. 5.

FIG. 7 graphically illustrates an example of generating a locality-sensitive hash for a subsequence of machine language instructions in accordance with an embodiment of the present invention.

FIG. 8 graphically illustrates another example of generating a locality-sensitive hash for another subsequence of machine language instructions in accordance with an embodiment of the present invention.

FIG. 9 shows a detection pattern in accordance with an embodiment of the present invention.

FIG. 10 graphically illustrates detection of malicious codes in binary data in accordance with an embodiment of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
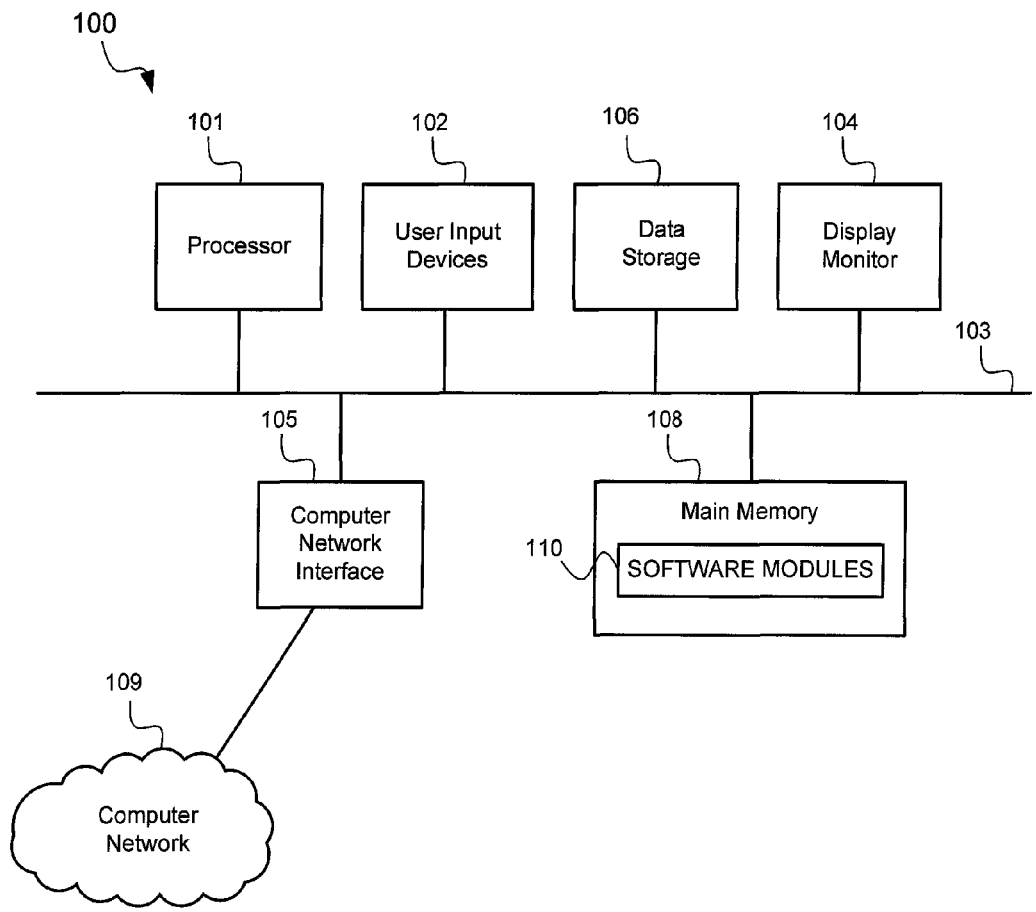
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as an endpoint computer system, a backend computer system, and other computers described below. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise a malicious code detector when the computer 100 is employed as an endpoint computer system.

The computer 100 may be configured to perform its functions by executing the software modules 110. The software modules 110 may be loaded from the data storage device 106 to the main memory 108. An article of manufacture may be embodied as computer-readable storage medium including instructions that when executed by the computer 100 causes the computer 100 to be operable to perform the functions of the software modules 110.

Figure 2:
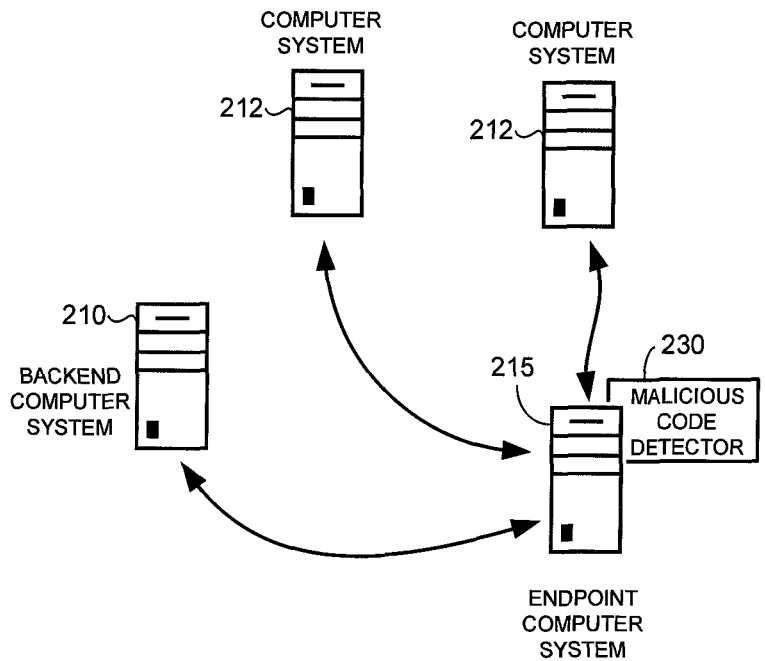
FIG. 2 shows a schematic diagram of a system for detecting malicious codes in accordance with an embodiment of the present invention.

FIG. 2 schematically shows a system for detecting malicious codes in accordance with an embodiment of the present invention. In the example of FIG. 2, the system includes a backend computer system 210 and an endpoint computer system 215. The endpoint computer system 215 and the backend computer system 210 may communicate with each other and with other computers, such as computer systems 212, over a computer network, which may include the Internet. The endpoint computer system 215 may comprise one or more computers for detecting malicious codes by, for example, running a malicious code detector 230.

As is well-known, a machine language instruction (also known as "binary instruction") is an instruction that is directly executed by the computer's processor. An assembly language instruction is a more human-readable form of a machine language instruction. An operation code (hereinafter "opcode") is the portion of a machine language instruction or assembly language instruction that specifies the operation to be performed by the processor.

In one embodiment, the endpoint computer system 215 detects malicious codes, such as a sequence of malicious machine language instructions, by receiving a sequence of machine language instructions from files, main memory, etc., disassembling the machine language instructions into assembly language instructions, normalizing the operation codes of the assembly language instructions, forming groups of normalized opcodes of the assembly language instructions, and generating a locality-sensitive hash for each group of normalized opcodes. In one embodiment, a group of normalized opcodes comprises normalized opcodes of assembly language instructions of a subsequence of machine language instructions. Subsequences of the sequence of machine language instructions may be separated by a delimiter, which may comprise a predetermined machine language instruction. To detect malicious codes, the locality-sensitive hashes of the sequence of machine language instructions may be compared to locality-sensitive hashes of known malicious sequences of machine language instructions, i.e., known malicious codes.

Figure 3:
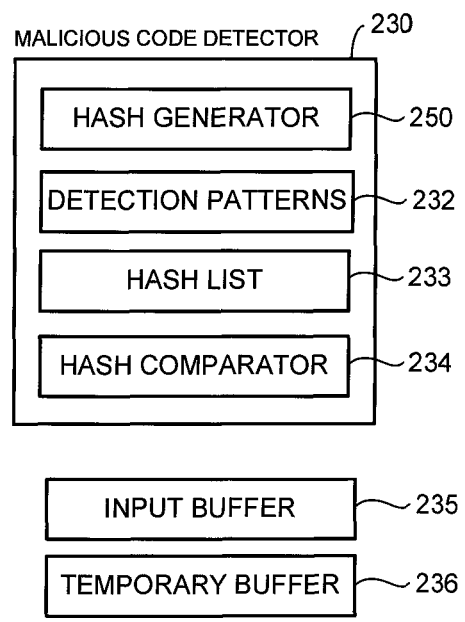
FIG. 3 shows a schematic diagram of a malicious code detector in accordance with an embodiment of the present invention.

In one embodiment, the malicious code detector 230 is implemented in software. As can be appreciated, the malicious code detector 230 may also be implemented in hardware (e.g., application specific integrated circuit, hardwired logic circuits) or combination of hardware and software. As shown in FIG. 3, the malicious code detector 230 may comprise a hash generator 250, detection patterns 232, a hash list 233, and a hash comparator 234. The components of the malicious code detector 230 may comprise software modules executed by the processor of the endpoint computer system 215 and stored in computer-readable storage medium, such as main memory.

In one embodiment, the hash generator 250 generates a locality-sensitive hash for each subsequence of a sequence of machine language instructions. In one embodiment, the sequence of machine language instructions are stored in an input buffer 235. The input buffer 235 and a temporary buffer 236 may comprise pre-allocated locations in main memory, for example. In general, the sequence of machine language instructions may be from a file, memory, and binary buffers. A group of normalized opcodes of a subsequence of the sequence of machine language instructions may be collected in the temporary buffer 236. A locality-sensitive hash may be generated for the group of normalized opcodes in the temporary buffer 236.

The detection patterns 232 comprise patterns and rules for detecting malicious codes. In one embodiment, a detection pattern 232 specifies one or more locality-sensitive hashes of known malicious codes that when all found in binary data, such as a sequence of machine language instructions, indicate presence of malicious code in the binary data.

A locality-sensitive hash of known malicious code is also referred to herein as a "reference locality-sensitive hash." A locality-sensitive hash of binary data being evaluated for malicious code is also referred to herein as a "target locality-sensitive hash." The hash comparator 234 compares a target locality-sensitive hash to a reference locality-sensitive hash to determine if the target and reference locality-sensitive hash match, i.e., identical locality-sensitive hashes. In one embodiment, binary data is deemed to be malicious code if and only if all of the reference locality-sensitive hashes of a particular detection pattern 232 have matching locality-sensitive hashes in the binary data.

The hash list 233 may comprise a listing of reference locality-sensitive hashes of all of the detection patterns 232 in the endpoint computer system 215. The hash list 233 is optional but speeds up the process of matching target locality-sensitive hashes with reference locality-sensitive hashes by providing a single listing to be checked. Otherwise, a target locality-sensitive hash will have to be checked against every detection pattern 232. More specifically, if a target locality-sensitive hash does not have a matching reference locality-sensitive hash in the hash list 233, the target locality-sensitive hash is not in any of the detection patterns 232 and may thus be dropped from further processing.

Figure 4:
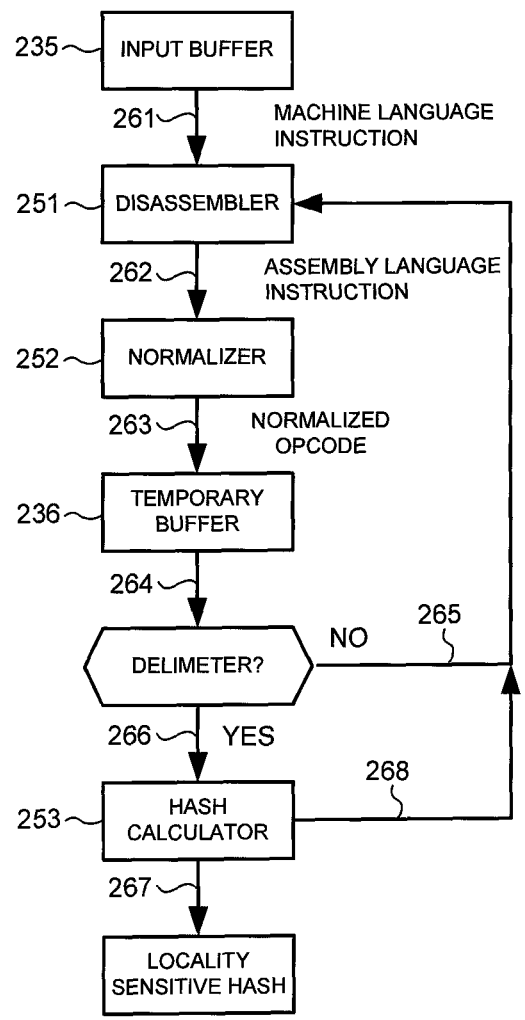
FIG. 4 shows a flow diagram of an example operation of a hash generator that generates locality-sensitive hashes for detecting malicious codes in accordance with an embodiment of the present invention.

FIG. 4 shows a flow diagram of an example operation of the hash generator 250 in accordance with an embodiment of the present invention. In the example of FIG. 4, the hash generator 250 comprises a disassembler 251, a normalizer 252, and a hash calculator 253.

As is well-known, an assembler translates ("assembles") an assembly language instruction into a machine language instruction; a disassembler performs the opposite function, which is to translate ("disassembles") a machine language instruction into an assembly language instruction. In the example of FIG. 4, the disassembler 251 disassembles a machine language instruction into an equivalent assembly language instruction. More specifically, binary data comprising a sequence of machine language instructions may be stored in the input buffer 235. The disassembler 251 receives a machine language instruction from the input buffer 235 (see arrow 261) and disassembles the machine language instruction into an assembly language instruction (see arrow 262). The normalizer 252 receives the assembly language instruction, normalizes the opcode of the assembly language instruction, and stores the normalized opcode in the temporary buffer 236 (see arrow 263). In one embodiment, the normalized opcodes are stored in the temporary buffer 236 in the same order that they appear in the sequence of machine language instructions.

FIG. 5 shows an example sequence of machine language instructions stored in consecutive memory locations 004010AC to 00401124 of the input buffer 235. Also shown in FIG. 5 are the machine language instructions (e.g., "B8 FD000000" in memory location 004010AC) and equivalent assembly language instructions (e.g., "MOV EAX, OFD"). The sequence of machine language instructions shown in FIG. 5 is for the Intel™ x86 processor. As can be appreciated, embodiments of the present invention may also be employed to detect malicious codes that run on other processors.

In the example of FIG. 5, the sequence of machine language instructions is divided into three subsequences. The first subsequence comprises consecutive machine language instructions stored in memory locations 004010AC to 004010CF, the second subsequence comprises consecutive machine language instructions stored in memory locations 004010D0 to 004010F2, and the third subsequence comprises consecutive machine language instructions stored in memory locations 004010F3 to 00401124. Each of the subsequences is delimited by a return instruction, which has the opcode "C3" in machine language or "RETN" in assembly language. Generally speaking, a delimiter marks the end of a subsequence of machine language instructions. There may be more than one delimiter and a delimiter may be any predetermined machine language instruction other than a return instruction.

FIG. 6 shows the first subsequence of the machine language instructions shown in FIG. 5. In the example of FIG. 6, the subsequence includes push instructions with the opcodes "50" and "FF35" in machine language and "PUSH EAX" and "PUSH DWORD PTR," respectively, in assembly language. It is to be noted that the opcodes "PUSH EAX" and "PUSH DWORD PTR" have different binary representations (i.e., different representations in machine language) but are the same type of instruction, which is a push instruction. In one embodiment, the normalizer 252 normalizes these two different, but functionally similar push instructions by assigning the same normalized opcode, which is simply "PUSH" in the example of FIG. 6, to both "PUSH EAX" and "PUSH DWORD PTR". That is, the normalizer 252 normalizes the opcodes of different variants of a type of instruction into a common normalized opcode in assembly language. Advantageously, this allows the malicious code detector 230 to detect slightly different versions of malicious codes, such as when the cybercriminal modifies a malicious code by replacing a machine language instruction with a different but functionally similar machine language instruction.

In one embodiment, the normalizer 252 normalizes an opcode of an assembly language instruction by only taking the first word of the opcode (e.g., "PUSH") and not using the rest of the opcode in the normalized opcode. This results in the opcodes "PUSH EAX" and "PUSH DWORD PTR" being both normalized into "PUSH". In this embodiment, "PUSHAD" and "PUSH EDI" will be different opcodes (i.e., one is "PUSHAD" and the other is "PUSH") even after normalization because they have different first words.

Referring back to FIG. 4, the process of disassembling a machine language instruction into an assembly language instruction, normalizing the opcode of the assembly language instruction, and storing the normalized opcode in the temporary buffer 236 are repeated until the end of the subsequence (see arrow 265). In other words, the hash generator 250 continues with receiving the next machine language instruction of the subsequence, disassembling the machine language instruction, normalizing the machine language instruction, etc. for the rest of the subsequence. As explained, the end of a subsequence may be marked by a predetermined delimiter, such as the machine language instruction with the opcode "C3" in the example of FIG. 5. More specifically, normalized opcodes are generated and stored in the temporary buffer 236 for all machine language instructions of a subsequence.

The hash calculator 253 receives the normalized opcodes for the subsequence stored in the temporary buffer 236 (see arrow 266) and calculates a hash of the normalized opcodes to generate a locality-sensitive hash for the normalized opcodes (see arrow 267). The hash calculator 253 may generate a locality-sensitive hash using any suitable hashing algorithm, such as cyclic redundancy check (CRC). The generated hash is locality-sensitive because of the normalization performed on the opcodes. More particularly, the generated hash is locality-sensitive because the same hash can be used to detect several, different subsequences of malicious machine language instructions that vary slightly (e.g., by code shifting or simple code substitution).

After generating the locality-sensitive hash for the normalized opcodes in the temporary buffer 236, the hash generator 250 clears the temporary buffer 236 and starts on processing the next subsequence of machine language instructions to generate their corresponding locality-sensitive hash (see arrow 268).

FIG. 7 graphically illustrates an example of generating a locality-sensitive hash for a subsequence of machine language instructions in accordance with an embodiment of the present invention. In the example of FIG. 7, the subsequence of machine language instructions is in consecutive memory locations 00453820 to 00453830 of the input buffer 235. The subsequence of machine language instructions is delimited by a machine language instruction having the opcode "EB", which is a jump instruction. The opcodes of the assembly language instructions, which are "PUSHAD", "MOV", "LEA", "PUSH", "OR", and "JMP" are normalized and stored in the same sequential order in the temporary buffer 236 (see arrow 301). A locality-sensitive hash is then calculated for the normalized opcodes, which in this example is 0x4777BE27 using the CRC hash algorithm (see arrow 302).

FIG. 8 graphically illustrates another example of generating a locality-sensitive hash for another subsequence of machine language instructions in accordance with an embodiment of the present invention. In the example of FIG. 8, the subsequence of machine language instructions is in consecutive memory locations 004A5C20 to 004A5C30 of the input buffer 235. The subsequence of machine language instructions is delimited by the same predetermined machine language instruction having the opcode "EB". The opcodes of the assembly language instructions of FIG. 8, which are "PUSHAD", "MOV", "LEA", "PUSH", "OR", and "JMP" are normalized and stored in the same sequential order in the temporary buffer 236 (see arrow 303). A locality-sensitive hash is then calculated for the normalized opcodes, which in the example of FIG. 8 is 0x4777BE27 using the CRC algorithm (see arrow 304). Note that this is the same as the locality-sensitive hash of the subsequence of FIG. 7. Further note that in the example of FIGS. 7 and 8, a locality-sensitive hash is calculated only from the first word of the opcodes of the assembly language instructions; parameters and other parts of the assembly language instructions are not included in the calculation of the locality-sensitive hash.

Comparison of the subsequences of machine language instructions of FIGS. 7 and 8 reveals that the two subsequences are different. For example, the opcode "LEA" in the subsequence of FIG. 7 has an operand (see FIG. 7, see 305) that is different from that of the opcode "LEA" in the subsequence of FIG. 8 (see FIG. 8, see 306). However, despite these differences, embodiments of the present invention allow for generation of the same locality-sensitive hash for both subsequences. More particularly, the subsequences of FIGS. 7 and 8 have different binary representations in the input buffer but have identical assembly language opcode representation in the temporary buffer. This means that, in embodiments of the present invention, a single locality-sensitive hash may be generated to cover slightly different versions of malicious codes.

FIG. 9 shows a detection pattern 232-1 in accordance with an embodiment of the present invention. The detection pattern 232-1 is a particular embodiment of the detection patterns 232. In the example of FIG. 9, the detection pattern 232-1 includes 3 locality-sensitive hashes, which are labeled as HASH 1, HASH 2, and HASH 5. As can be appreciated, a detection pattern 232 may have more or fewer locality-sensitive hashes.

The locality-sensitive hashes of the detection pattern 232-1 are reference locality-sensitive hashes in that they are generated from known malicious code. Generally speaking, a detection pattern 232 includes one or more hashes that when found in the same sequence of machine language instructions, in any order, indicate presence of malicious code. For example, when binary data comprising a sequence of machine language instructions has locality-sensitive hashes that match HASH 1, HASH 2, and HASH 3 of the detection pattern 232-1, the sequence of machine language instructions may be deemed to be malicious code.

Generally speaking, the locality-sensitive hashes of a detection pattern 232 may be generated from known malicious codes in the same manner explained above. For example, a hash generator 250 running on the backend computer system 210 may generate locality-sensitive hashes for a sequence of known malicious machine language instructions. The locality-sensitive hashes may be employed as references and used in detection patterns 232 for detecting the malicious machine language instructions. The reference locality-sensitive hashes for all detection patterns 232 may be stored as a hash list 233. The backend computer system 210 may package the hash generator 250, detection patterns 232, hash list 233, and hash comparator 234 as part of a malicious code detector 230 that is distributed to subscribing endpoint computer systems 215.

FIG. 10 graphically illustrates detection of malicious codes in binary data in accordance with an embodiment of the present invention. In the example of FIG. 10, the samples labeled as SAMPLE A, SAMPLE B, SAMPLE C, and SAMPLE D each comprises binary data, which may be obtained from files, memory, buffers, and other computer-readable medium. The binary data may comprise a sequence of machine language instructions. The operation of the example of FIG. 10 may be performed by the endpoint computer system 215 by running the malicious code detector 230.

In the example of FIG. 10, locality-sensitive hashes are generated for each of the samples SAMPLE A, SAMPLE B, SAMPLE C, and SAMPLE D. In the example of FIG. 10, the locality-sensitive hashes 351 consisting of locality-sensitive hashes HASH 1, HASH 2, HASH 3, HASH 4, and HASH 5 are calculated from SAMPLE A; the locality-sensitive hashes 352 consisting of locality-sensitive hashes HASH 2, HASH 5, HASH 4, HASH 1, and HASH 3 are calculated from SAMPLE B; the locality-sensitive hashes 353 consisting of locality-sensitive hashes HASH 1, HASH 2, HASH 4, and HASH 5 are calculated from SAMPLE C; and the locality-sensitive hashes 354 consisting of locality-sensitive hashes HASH 6, HASH 1, HASH 2, HASH 7, HASH 5, and HASH 8 are calculated from SAMPLE D. As before, each locality-sensitive hash is for a subsequence of the samples.

The hash list 360 shows the reference locality-sensitive hashes of the detection pattern 232-1 and other detection patterns employed by the malicious code detector. The hash list 360 includes the reference locality-sensitive hashes HASH 1, HASH 2, and HASH 5 of the detection pattern 232-1 and other reference locality-sensitive hashes of other detection patterns.

In the example of FIG. 10, the matching hashes 361-364 show the locality-sensitive hashes of SAMPLE A, SAMPLE B, SAMPLE C, and SAMPLE D, respectively, that match the reference locality-sensitive hashes of the detection pattern 232-1. As shown in FIG. 10, the matching hashes 361 show that the SAMPLE A has locality-sensitive hashes that match all of the reference locality-sensitive hashes of the detection pattern 232-1. It is to be noted that the matching locality-sensitive hashes do not have to be in any particular order. Similarly, the matching hashes 362-364 also show that SAMPLE B, SAMPLE C, and SAMPLE D have locality-sensitive hashes that match the reference locality-sensitive hashes of the detection pattern 232-1. Accordingly, the malicious code detector 230 deems the SAMPLE A, SAMPLE B, SAMPLE C, and SAMPLE D to be malicious code, which in this example is a sequence of malicious machine language instructions.

Figure 11:
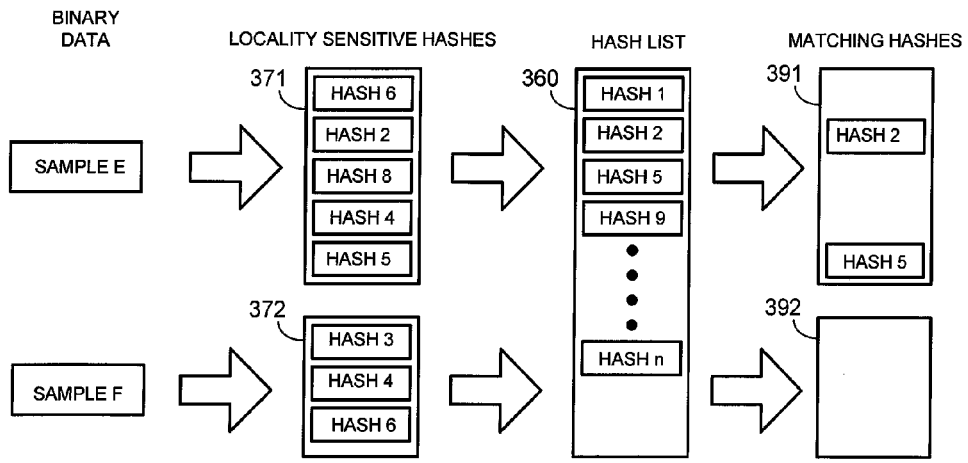
FIG. 11 graphically illustrates detection of malicious codes in binary data in accordance with an embodiment of the present invention.

FIG. 11 graphically illustrates detection of malicious codes in binary data in accordance with an embodiment of the present invention. The example of FIG. 11 illustrates the same operation as in FIG. 10, except that SAMPLE E and SAMPLE F are different from SAMPLE A, SAMPLE B, SAMPLE C, and SAMPLE D. In the example of FIG. 11, the locality-sensitive hashes 371 are from SAMPLE E and the locality-sensitive hashes 372 are from SAMPLE F. The hash list 360 is the same as in the example of FIG. 10, which includes the reference locality-sensitive hashes of the detection pattern 232-1 and reference locality-sensitive hashes of other detection patterns. As shown in FIG. 11, SAMPLE E has HASH 2 and HASH 5, but otherwise cannot meet the requirements of the detection pattern 232-1 because SAMPLE E has no HASH 1 (see matching hashes 391). The matching hashes 391 is an example of a partial match. SAMPLE F does not have any locality-sensitive hash that matches any of the reference locality-sensitive hashes of the detection pattern 232-1 (see matching hashes 392). The matching hashes 392 is an example of a no match. In both partial and no match cases, the sample is not deemed to be malicious. More specifically, the malicious code detector 230 does not deem SAMPLE E or SAMPLE F to be malicious code.

Figure 12:
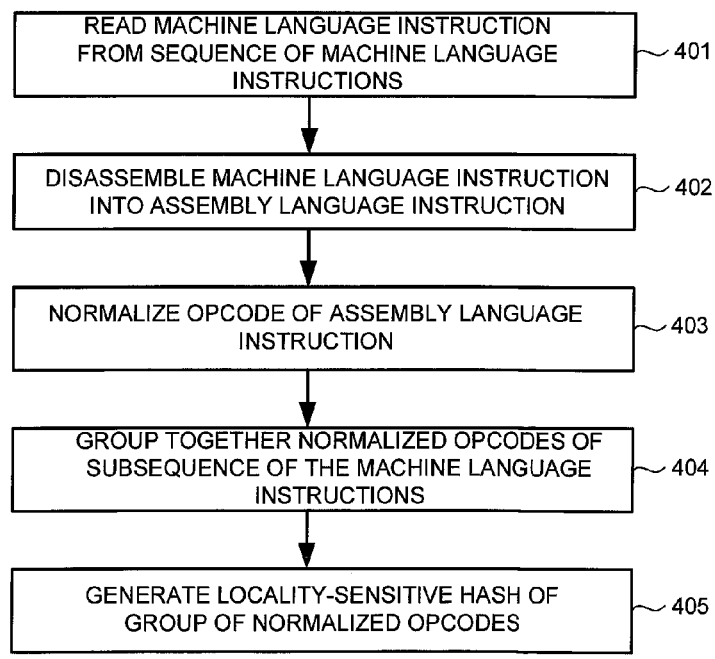
FIG. 12 shows a flow diagram of a computer-implemented method of generating locality-sensitive hashes for detecting malicious code in binary data in accordance with an embodiment of the present invention.

FIG. 12 shows a flow diagram of a method of generating locality-sensitive hashes for detecting malicious code in binary data in accordance with an embodiment of the present invention. The method of FIG. 12 is explained using previously-described components for ease of illustration. As can be appreciated, other suitable components may also be employed without detracting from the merits of the present invention.

In the example of FIG. 12, the endpoint computer system 215 reads a machine language instruction from a sequence of machine language instructions stored in the input buffer 235 (step 401). The endpoint computer system 215 disassembles the machine language instruction into an assembly language instruction (step 402). The endpoint computer system 215 normalizes the opcode of the assembly language instruction (step 403). The endpoint computer system 215 groups together normalized opcodes of each subsequence of the sequence of machine language instructions (step 404). Each subsequence may be delimited by a predetermined delimiter, such as a particular machine language instruction. The normalized opcodes of a subsequence may be grouped together in the temporary buffer 236, which can be cleared after the locality-sensitive hash of the group of normalized opcodes has been calculated for the subsequence (step 405). The endpoint computer system 215 may continue to read a machine language instruction from the sequence of machine language instructions until a locality-sensitive hash has been generated for each subsequence of the sequence of machine language instructions. The method of FIG. 12 may be employed in the backend computer system 210 to generate reference locality-sensitive hashes of detection rules 232 and in the endpoint computer system 215 to generate target locality-sensitive hashes of binary data being evaluated for malicious code.

Figure 13:
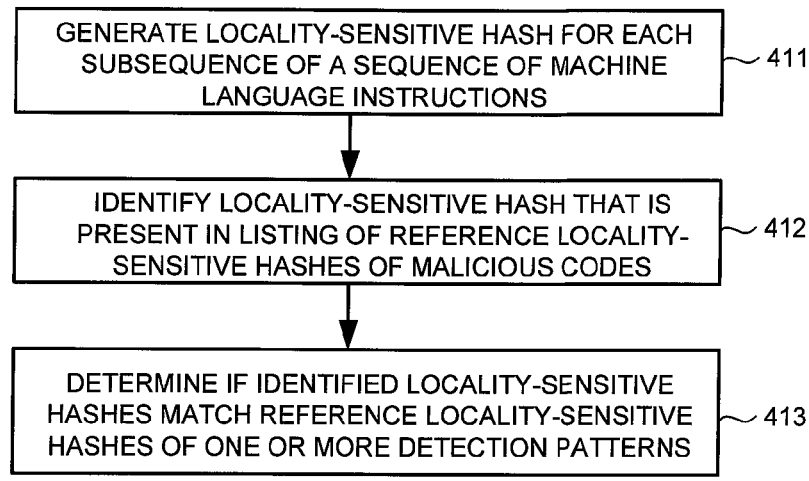
FIG. 13 shows a flow diagram of a computer-implemented method of detecting malicious codes in binary data in accordance with an embodiment of the present invention.

FIG. 13 shows a flow diagram of a method of detecting malicious codes in binary data in accordance with an embodiment of the present invention. The method of FIG. 13 is explained using previously disclosed components for ease of illustration. Other suitable components may also be employed without detracting from the merits of the present invention.

In the example of FIG. 13, the endpoint computer system 215 generates a locality-sensitive hash for each subsequence of a sequence of machine language instructions (step 411) in accordance with the method of FIG. 12, for example. The endpoint computer system 215 identifies a locality-sensitive hash of the sequence of machine language instructions that is present in the hash list 360 that includes the reference locality-sensitive hashes of detection patterns 232 (step 412). The endpoint computer system 215 determines if identified locality-sensitive hashes of the sequence of machine language instructions match all reference locality-sensitive hashes of one or more detection patterns 232 (step 413). The endpoint computer system 215 deems the sequence of machine language instructions to be malicious code when its locality-sensitive hashes match all reference locality hashes of one or more detection patterns 232.

Methods and systems for detecting malicious codes in binary data have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
reading a first machine language instruction from a sequence of machine language instructions;
disassembling the first machine language instruction into a first assembly language instruction;
reading a second machine language instruction from the sequence of machine language instructions;
disassembling the second machine language instruction into a second assembly language instruction;
forming a first group of opcodes for a first subsequence of the sequence of machine language instructions, the first group of opcodes including at least a first opcode of the first assembly language instruction and a second opcode of the second assembly language instruction;
generating a first locality-sensitive hash for the first group of opcodes; and
determining whether the sequence of machine language instructions comprises malicious code by comparing the first locality-sensitive hash to a reference locality sensitive hash of a known malicious sequence of machine language instructions,
wherein the first machine language instruction and the second machine language instruction are part of a subsequence of the sequence of machine language instructions,
wherein the subsequence is delimited by a third machine language instruction that marks an end of the subsequence.

2. The method of claim 1, further comprising:
consulting a listing of reference locality-sensitive hashes of known malicious sequences of machine language instructions.

3. The method of claim 1, wherein generating the first locality-sensitive hash for the first group of opcodes comprises:
normalizing the first opcode of the first assembly language instruction and the second opcode of the second assembly language instruction prior to including the first opcode of the first assembly language instruction and the second opcode of the second assembly language instruction into the first group of opcodes; and
calculating a hash of the first group of opcodes.

4. The method of claim 3, wherein the first assembly language instruction and the second assembly language instruction have different binary representations, and normalizing the first opcode of the first assembly language instruction and the second opcode of the second assembly language instruction comprises assigning a same normalized opcode to both the first opcode of the first assembly language instruction and the second opcode of the second assembly language instruction.

5. The method of claim 1, wherein the first machine language instruction and the second machine language instruction are read from an input buffer containing the sequence of machine language instructions.

6. The method of claim 1, further comprising:
generating a second locality a locality-sensitive hash for a second group of opcodes of assembly language instructions, wherein the first locality-sensitive hash and the second locality-sensitive hash have matching reference locality-sensitive hashes in a same detection pattern for detecting malicious codes.

7. A system comprising:
an endpoint computer system that disassembles a first machine language instruction into a first assembly language instruction, disassembles a second machine language instruction into a second assembly language instruction, forms a first group of opcodes for a first subsequence of a sequence of machine language instructions that includes at least a first opcode of the first assembly language instruction and a second opcode of the second assembly language instruction, generates a first locality-sensitive hash for the first group of opcodes, and determines whether the sequence of machine language instructions comprises malicious code by comparing the first locality-sensitive hash to a first reference locality sensitive hash of a known malicious sequence of machine language instructions,
wherein the endpoint computer system forms the first group of opcodes in a temporary buffer and clears the temporary buffer after generating the first locality-sensitive hash for the first group of opcodes in the temporary buffer.

8. The system of claim 7, further comprising:
a backend computer system that provides the endpoint computer system a malicious code detector for determining whether the sequence of machine language instructions comprises malicious code.

9. The system of claim 7, wherein the endpoint computer system reads the first machine language instruction and the second machine language instruction from an input buffer containing the sequence of machine language instructions.

10. The system of claim 7, wherein the endpoint computer system generates the first locality-sensitive hash for the first group of opcodes by normalizing the first opcode of the first assembly language instruction and the second opcode of the second assembly language instruction prior to including the first opcode of the first assembly language instruction and the second opcode of the second assembly language instruction into the first group of opcodes and calculating a hash of the first group of opcodes.

11. The system of claim 7, wherein the first assembly language instruction and the second assembly language instruction have different binary representations, and the endpoint computer system normalizes the first opcode of the first assembly language instruction and the second opcode of the second assembly language instruction by using a same normalized opcode for both the first opcode of the first assembly language instruction and the second opcode of the second assembly language instruction.

12. The system of claim 7, wherein the endpoint computer system reads the first machine language instruction and the second machine language instruction from an input buffer containing the sequence of machine language instructions.

13. A computer-implemented method comprising:

disassembling a plurality of machine language instructions of binary data into a plurality of assembly language instructions;

normalizing opcodes of the plurality of assembly language instructions into normalized opcodes, wherein at least one of the normalized opcodes have at least two different binary representations;

calculating a hash of the normalized opcodes to generate a locality-sensitive hash; and comparing the locality-sensitive hash to reference locality-sensitive hashes of known malicious machine language instructions to determine whether the binary data comprises malicious code, wherein the plurality of machine language instructions is from a subsequence of a sequence of machine language instructions of the binary data, wherein the subsequence is delimited from other subsequences of the sequence of machine language instructions of the binary data by a predetermined machine language instruction.

* * * * *